(12) United States Patent
Edwards, Jr. et al.

(10) Patent No.: US 7,891,254 B2
(45) Date of Patent: Feb. 22, 2011

(54) DEVICE AND METHOD FOR PROVIDING STRAIN MEASUREMENTS OF INSULATED PIPES

(75) Inventors: Roderick Y Edwards, Jr., Escondido, CA (US); Andrew Russell Mail, San Marcos, CA (US); Matthew J Kinney, Oceanside, CA (US)

(73) Assignee: BMT Scientific Marine Services, Inc., Houston, TX (US)

( * ) Notice: Subject to any disclaimer, the term of this patent is extended or adjusted under 35 U.S.C. 154(b) by 156 days.

(21) Appl. No.: 12/137,427

(22) Filed: Jun. 11, 2008

(65) Prior Publication Data
US 2008/0303382 A1 Dec. 11, 2008

Related U.S. Application Data

(60) Provisional application No. 60/943,275, filed on Jun. 11, 2007.

(51) Int. Cl.
*G01N 3/02* (2006.01)
(52) U.S. Cl. .......................... 73/856; 73/760
(58) Field of Classification Search ............ 73/856–860
See application file for complete search history.

(56) References Cited

U.S. PATENT DOCUMENTS

| | | | |
|---|---|---|---|
| 3,857,452 A * | 12/1974 | Hartman | 177/139 |
| 4,487,078 A * | 12/1984 | Schmitz et al. | 73/862.06 |
| 4,932,253 A * | 6/1990 | McCoy | 73/152.61 |
| 5,814,181 A * | 9/1998 | Richter et al. | 156/351 |
| 6,059,264 A * | 5/2000 | Kaminski et al. | 254/134.4 |
| 6,292,436 B1 | 9/2001 | Rau et al. | |
| 6,315,497 B1 | 11/2001 | Wittman et al. | |
| 6,374,893 B1 | 4/2002 | Behl | |
| 6,959,604 B2 | 11/2005 | Bryant et al. | |
| 7,171,315 B2 * | 1/2007 | Loose | 702/45 |
| 7,194,913 B2 | 3/2007 | Morrison et al. | |
| 7,343,818 B2 * | 3/2008 | Gysling et al. | 73/861.18 |
| 2006/0115335 A1 | 6/2006 | Allen et al. | |
| 2010/0065326 A1 * | 3/2010 | Ko | 174/84 R |

FOREIGN PATENT DOCUMENTS

GB      2431974 A      5/2007

OTHER PUBLICATIONS

International Search Report from PCT/US2008/066606, Sep. 11, 2008, 1 page.
International Preliminary Report on Patentability & Written Opinion from PCT/US2008/066606, Dec. 30, 2009, 7 pages.
Edwards, Roderick Y., Jr., et al, "Load Monitoring at the Touchdown Point of the First Steel Catenary Riser Installed in a Deepwater Moored Semisubmersible Platform", Offshore Technology Conference, OTC 10975, May 1999, in 9 pages.

* cited by examiner

*Primary Examiner*—Max Noori
(74) *Attorney, Agent, or Firm*—Knobbe, Martens, Olson & Bear, LLP

(57) ABSTRACT

This disclosure provides methods and apparatuses to monitor strain in a steel pipe with reduced or eliminated disruption of the insulative and anti-corrosive layers or coatings that cover the pipe. The methods and apparatuses can include an attachment scheme that is less intrusive and less sensitive to dilation of the insulation layer on the pipe than previous strain monitoring solutions. Additionally, methods and apparatuses can reduce corrosion by virtue of the reduction in the number and volume of metallic components.

26 Claims, 6 Drawing Sheets

DEVICE AND METHOD FOR PROVIDING STRAIN MEASUREMENTS OF INSULATED PIPES

CROSS-REFERENCE TO RELATED APPLICATIONS

This application relates to and claims the benefit of U.S. Provisional Application No. 60/943,275, titled "Device and Method for Providing Strain Testing" and filed Jun. 11, 2007, the entirety of which is incorporated herein by reference.

BACKGROUND

1. Field

The present development relates to monitoring equipment, for example, monitoring the strain on a section of underwater pipe.

2. Description of the Related Art

Gas and oil drilling is performed in many different ways, on land and at sea. In marine drilling operations, large sections of steel pipe, often referred to as "catenary risers," are connected to stretch deep into the ocean and along the seabed. The length of this piping required to reach the sea floor, the pressure extremes, and the temperature extremes to which such pipe is subjected often result in undesirable strain and/or bends in the pipe.

The resulting bending strains the tolerances of the pipe. Unanticipated failure of such pipes can result in severe pollution and heavy economic loss. Thus, the monitoring of this "bending strain" in submerged pipes enables a continuous assessment of the integrity of the pipe.

These pipes are typically steel with several layers of insulation and anticorrosion protection to help reduce the effects of the pipe's submersion in water, particularly salt water, as well as the low temperatures and high pressures exerted at depth. The insulation and anticorrosion protection additionally help extend the longevity of the pipes, which may be in service in such harsh environments up to twenty-five or thirty years or more.

Heretofore, the strains in submerged pipes have been measured by a variety of strain sensors that are either bonded to the steel pipe surface or clamped in intimate contact with the steel surface, often using metal bands around the steel pipe. Such approaches are disruptive or damaging to the insulation and anti-corrosion coatings on such pipes. It is also time consuming and labor intensive to have to remove the layers of insulation and anti-corrosion coatings in order to attach the gauges. The clamping mechanisms themselves were typically steel or some other metal which is itself subject to the corrosive effects of the salt water—or even fresh water—in which the pipes were submerged. These approaches also can create more risk to the integrity of the pipe and/or its insulation.

SUMMARY

An aspect of at least one of the embodiments disclosed herein includes the realization that the damage caused to the insulated pipes noted above can be avoided by mounting the desired sensors to the outer surface of the insulation. The behavior of the interior pipe can be correlated to the behavior of the outer surface of the insulation. Thus, the behaviors detected at the outer surface can be used to determine the behavior of the pipe within the insulation. Thus, sufficient monitoring of the insulated pipe can be performed without removing or damaging the insulation in the same way the known techniques require removal and/or damaging the insulation.

Some embodiments disclosed herein provide methods and/or apparatuses that can be used to monitor strain in a steel pipe with reduced or eliminated disruption of the insulative, anti-corrosive layers, and/or coatings that cover the pipe. The methods and/or apparatuses can include an attachment scheme that is less intrusive and less sensitive to dilation of the insulation layer on the pipe than previous strain monitoring solutions. Additionally, methods and apparatuses can reduce corrosion by virtue of the reduction in the number and volume of metallic components.

Described below are embodiments of methods and apparatuses that can be used for attaching sensors such as, for example, but without limitation, Linear Variable Differential Transformer (LVDT)-type displacement sensors. Other strain sensors are also commercially available and can be used. In some embodiments, the sensor is attached to the surface of commonly used insulation and anti-corrosion coatings for submerged pipes, such as those for transporting gas and oil. However, other sensors and other materials can also be used.

BRIEF DESCRIPTION OF THE DRAWINGS

A general architecture that implements the various features of the present developments are described below with reference to the drawings. The drawings and the associated descriptions are provided to illustrate embodiments of the developments and not to limit its scope. Throughout the drawings, reference numbers are re-used to indicate correspondence between referenced elements.

DETAILED DESCRIPTION

Figure 1:
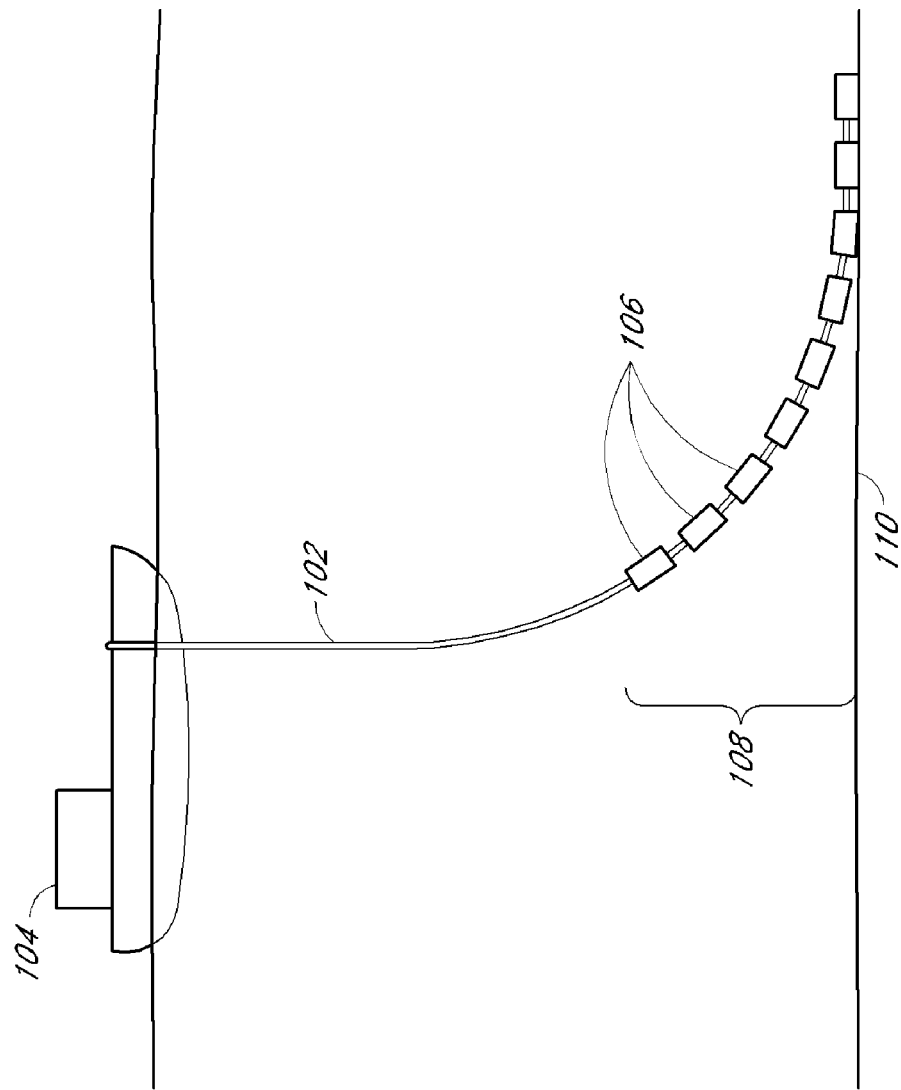
FIG. 1 illustrates an overall view of a pipe extending from a Floating Offshore Platform toward a wellhead for an oil production operation.

An overview of a typical layout of a pipe extending between a floating offshore platform and the well site of an operation for the production of oil or gas is illustrated in FIG. 1. As shown in the figure, in a typical configuration, insulated steal pipe 102 extends from an oil tanker 104 or other platform toward a well of a drilling operation. The pipe 102 extends downward from the boat 104 into contact with the seafloor with significant sag. The sag in the pipe 102 allows the boat 104 to move relative to the well without instantly breaking the pipe 102. Such a pipe can be used for production, i.e., collection of gas, oil, or other fluids from the well, or for other purposes.

The area of the pipe that nears and comes in contact with the sea floor 110 is often referred to as the touch down zone (or TDZ) 108. It is at this general location that the largest strains of the pipe usually occur, as the pipe 102 is bent as the platform or ship 104 moves in response to the swell, or other force, such as ocean currents, that act on the pipe 102.

In order to measure the strains experienced by the pipe 102 and help ensure that they are within tolerances, strain stations 106 can be provided at intervals along the pipe in and around the vicinity of the TDZ 108. These strain stations can include multiple strain gauges attached to the pipe with a protective plastic coating or protection blister surrounding them.

Previous solutions to testing such strains required removing the pipe's protective insulation to attach strain gauges as close to the steel pipe as possible. This was a costly and time-consuming process and exposed the steel pipe to a greater possibility of corrosion and damage than a pipe with intact insulation.

An aspect of at least one of the embodiments disclosed herein includes the realization that testing the strain on the outer insulation of the pipe 102 provides data that can be correlated to the strain of the inner steel pipe, sufficiently accurately for monitoring purposes. In some embodiments, data from strain gauges properly placed on the exterior of the pipe's insulation layers provides similar strain readings from strain gauges installed by removing or otherwise damaging the insulation, without much of the expense and damage of removing the insulation layers, attaching the sensors, and replacing some or all of the insulation. The attachment of strain gauges in accordance with the present embodiments requires less time and cost of both the materials used and the labor in attaching the gauges. The steel pipe also remains protected by having relatively undisturbed insulation.

In some embodiments, the attachment mechanisms can be made of a plastic such as polypropylene or some other corrosion resistant material. The use of fewer corrosive parts also lessens the likelihood of the strain gauge assemblies themselves wearing out or being damaged from prolonged emersion in water.

Figure 2:
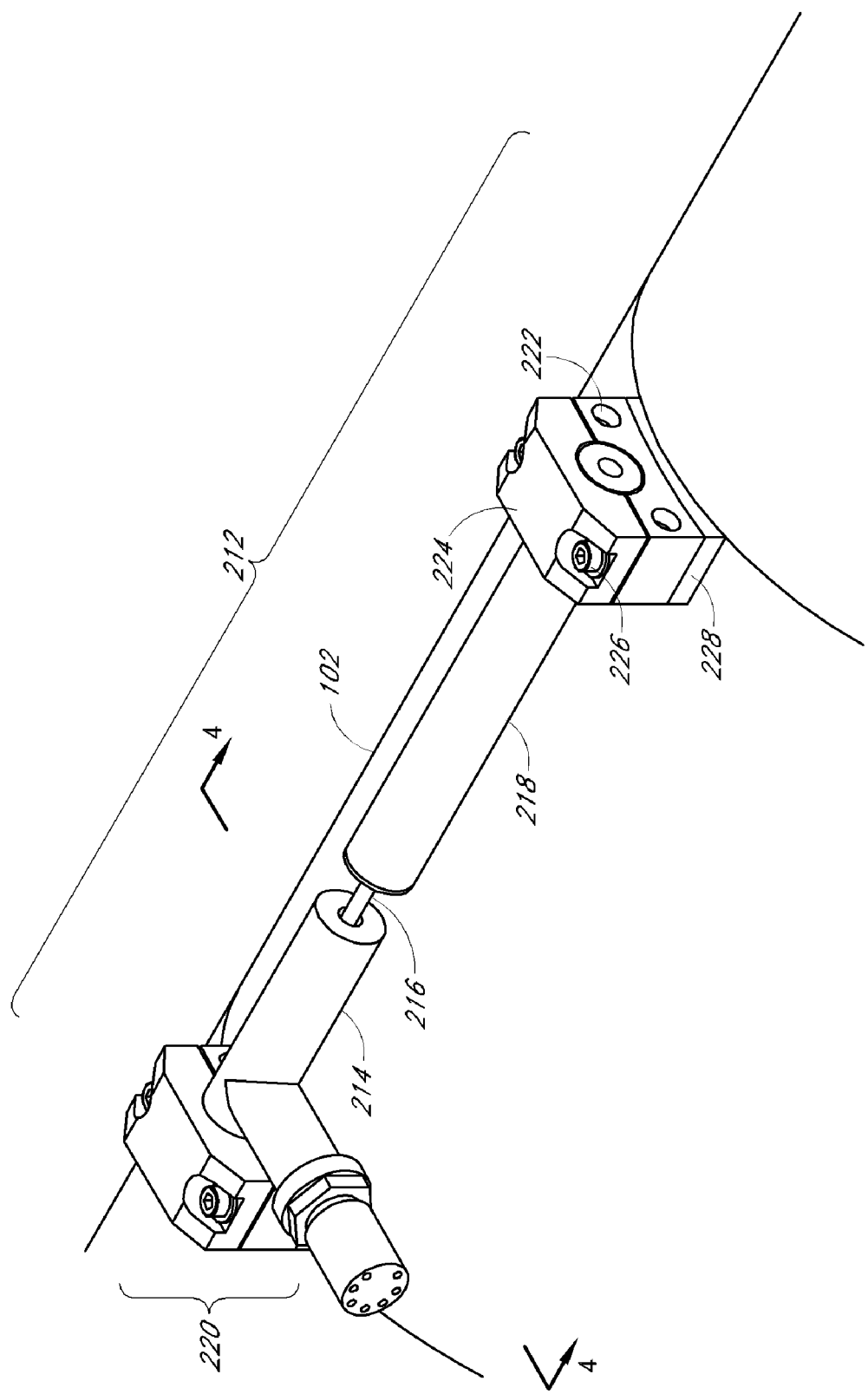
FIG. 2 is an enlarged perspective view of an embodiment of a strain station and an associated strain sensor assembly in accordance with an embodiment.

FIG. 2 illustrates a strain gauge assembly 212 connected to the pipe 102. In some embodiments, an LVDT-type displacement sensor 214 can be used as a strain sensor. The displacement sensor 214 can include an armature 216 and armature attachment bar 218.

The LVDT 214 can be configured to measure the displacement of the armature 216 relative to the armature attachment bar 218. Each end of the LVDT 214 can be held immobile with respect to the pipe being measured so that any displacement of the armature 216 relative to the armature attachment bar 218 would indicate that the pipe is bending under some strain.

In some embodiments, this strain gauge assembly 212 can be connected to the pipe's 102 insulation using clamps 220 near opposing ends of the strain gauge. The clamps 220 can be a split-block type clamp, having a clamp base 222 and a clamp top 224. However, other types of clamps can also be used.

In some embodiments, the clamp base 222 can be bonded directly to the insulation, such as by using a thermoplastic weld 228. The strain gauge assembly 212 can be held in place by securing the ends of the assembly 212 with two clamps, e.g., with the clamp tops 224 being screwed 226 or otherwise attached to the clamp base 222 with the corresponding portions of the assembly 212 clamped between the corresponding tops 224 and bases 222.

Figure 3:
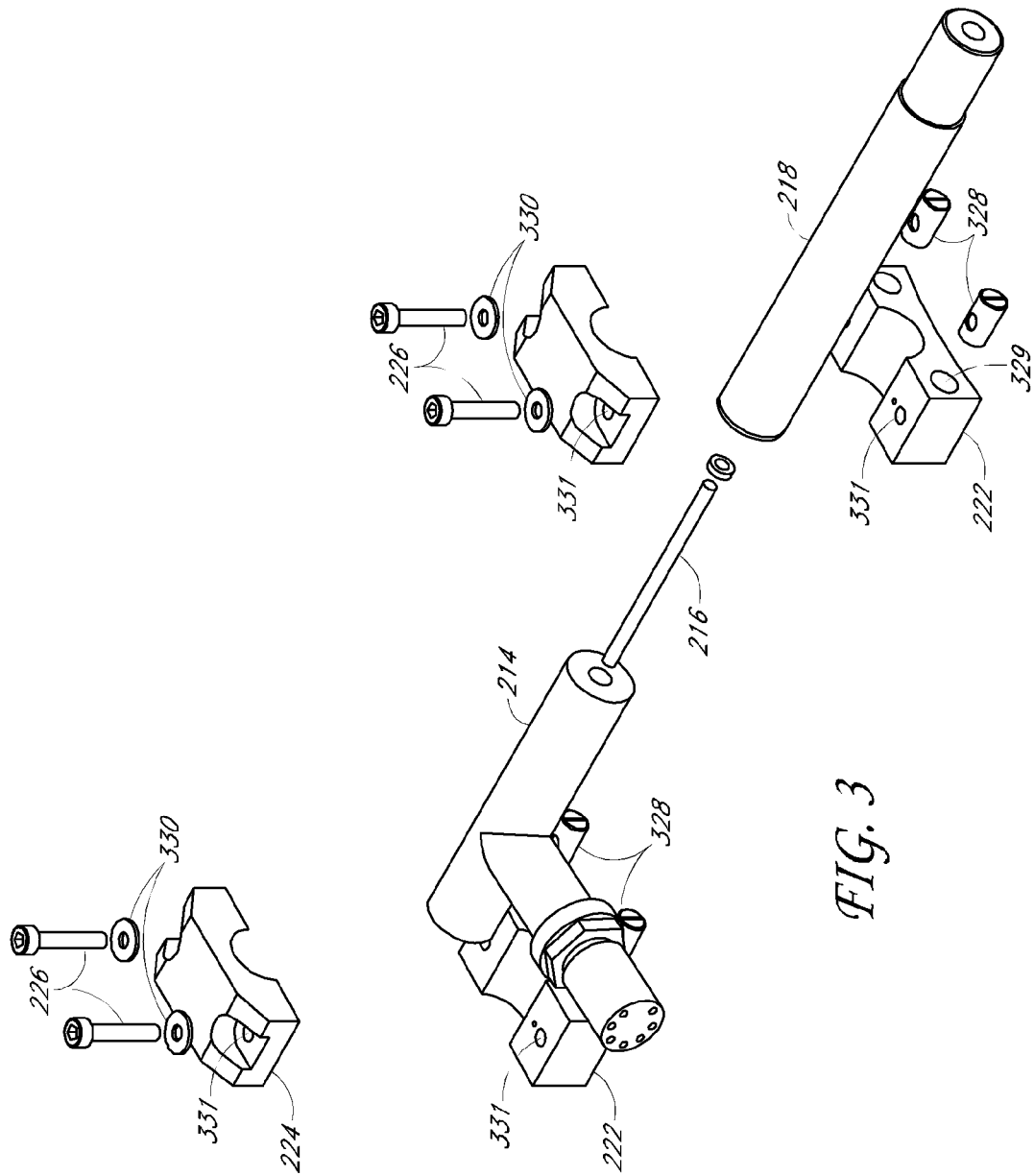
FIG. 3 illustrates an exploded view of the strain station shown in FIG. 2.

As shown in FIG. 3, bolts 226 and washers 330 can be attached to threaded dowels 328 to hold the clamp sections 222, 224 in place. The clamp sections may be composed of any suitable polypropylene ("PP"), polyethylene ("PE"), or polyvinyl chloride ("PVC") material. The clamp base 222, in particular, is preferably composed of a homopolymer polypropylene that is relatively noncompressible under pressure. In particular, embodiments of clamp sections 222, 224 preferably have any gas bubbles or pockets removed during manufacture to avoid compression and failure at the high pressures of deep water. Such material is available, for example, under the commercial name VERSADUR® Homopolymer Polypropylene 500 Natural. However, other materials can also be used. For example, in another embodiment, Moplen COAT EP/60 BIANCO, available from Basell USA, Inc., may be used for the clamp sections 222, 224. Preferable materials have a relatively low water absorption rate and a relatively low Izod impact strength. In particular, for example, one preferred material will have a water absorption of about 0.0100% or less based on the ASTM D 570 standard known to those in the art. The fasteners 226, dowels 328, and/or other parts of the fastening components can be made from any suitable material, including but without limitation, stainless steel, Monel 400, etc.

As such, in some embodiments, the clamp 220 can be configured such that a catastrophic impact to the clamp will break the clamp itself with minimal or no damage to the protective coating of the pipe 102. Clamps 220 are most preferably made of a material identical to the insulation surface material to which they will be attached. However, it is understood that any co- or homo-polymer polypropylene material with strength, water absorption, Young's modulus, Poisson's ratio, and thermal expansion properties similar to or identical to the particular pipe insulation surface material are also suitable, and other plastics can also be used for the systems and methods disclosed herein. The use of matching or substantially matching materials for the clamps 220 and the insulation surface material of the pipe helps ensure the longevity of the strain measurement system. The insulative materials used with the described piping have already been tested to withstand the extreme conditions of great ocean depths. Embodiments of the welding technique described herein essentially makes the clamps 220 an extension of the insulation surface material, thereby reducing the complexity and failure potential rather than adding to it as in the prior method of adding new attachment points of different materials.

Figure 4B:
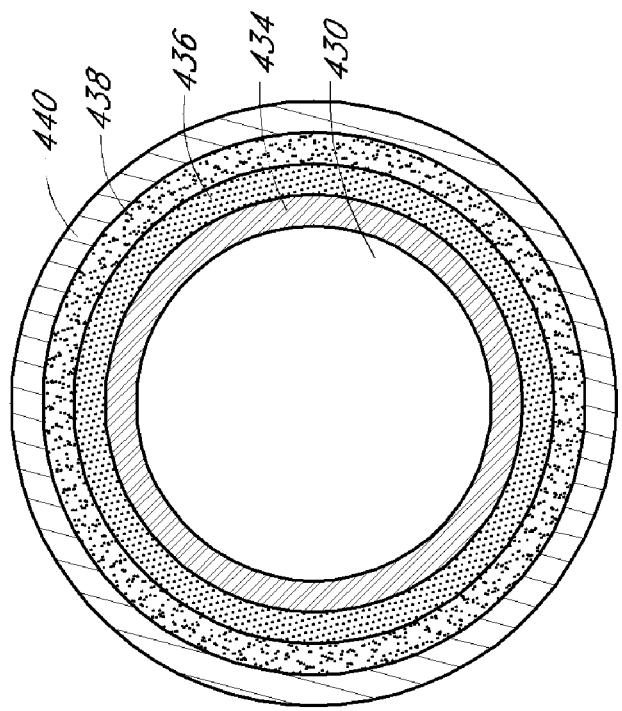
FIGS. 4A and 4B illustrate cross sectional views of two example pipes on which the embodiments can be used.
Figure 4A:
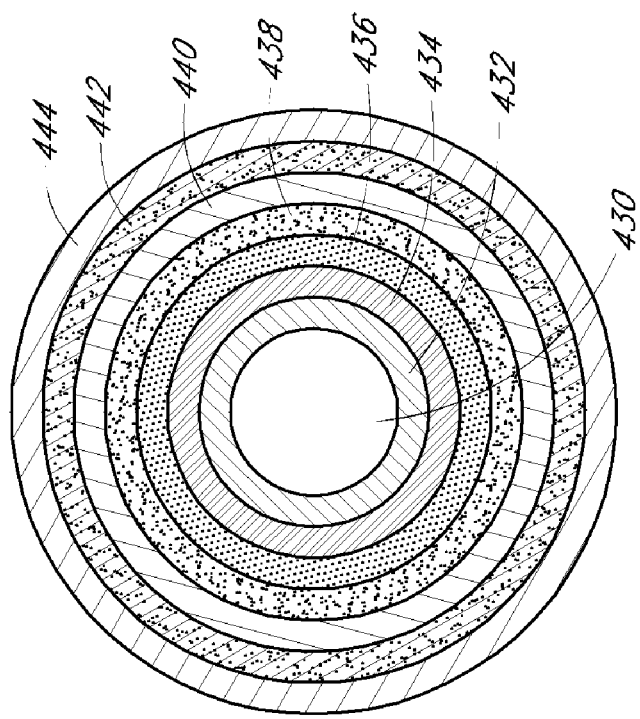

FIGS. 4A and 4B illustrate two insulated pipe configurations for which the strain gauge assembly and attachment methods disclosed herein can be used. Catenary risers (which can comprise sections of pipe 102) used in oil production often include five layers of insulation and anti-corrosion materials (often known as 5LPP). First the steel pipe 434 and internal cladding 432 define a cavity 430. The insulation builds out from the steel with layers of fusion bond epoxy 436, polypropylene adhesive 438, solid polypropylene 440, syntactic polypropylene 442, and solid polypropylene 444 (FIG. 4A). Similar piping is generally used for gas export risers, except that only three layers of insulation are used (often referred to as 3LPP): fusion bond epoxy 436, polypropylene adhesive 438, and solid polypropylene 444 (FIG. 4B). Regardless of the exact insulation, it is generally preferable to match the material for the clamps 220 with the outer solid polypropylene layer 444.

Figure 5:
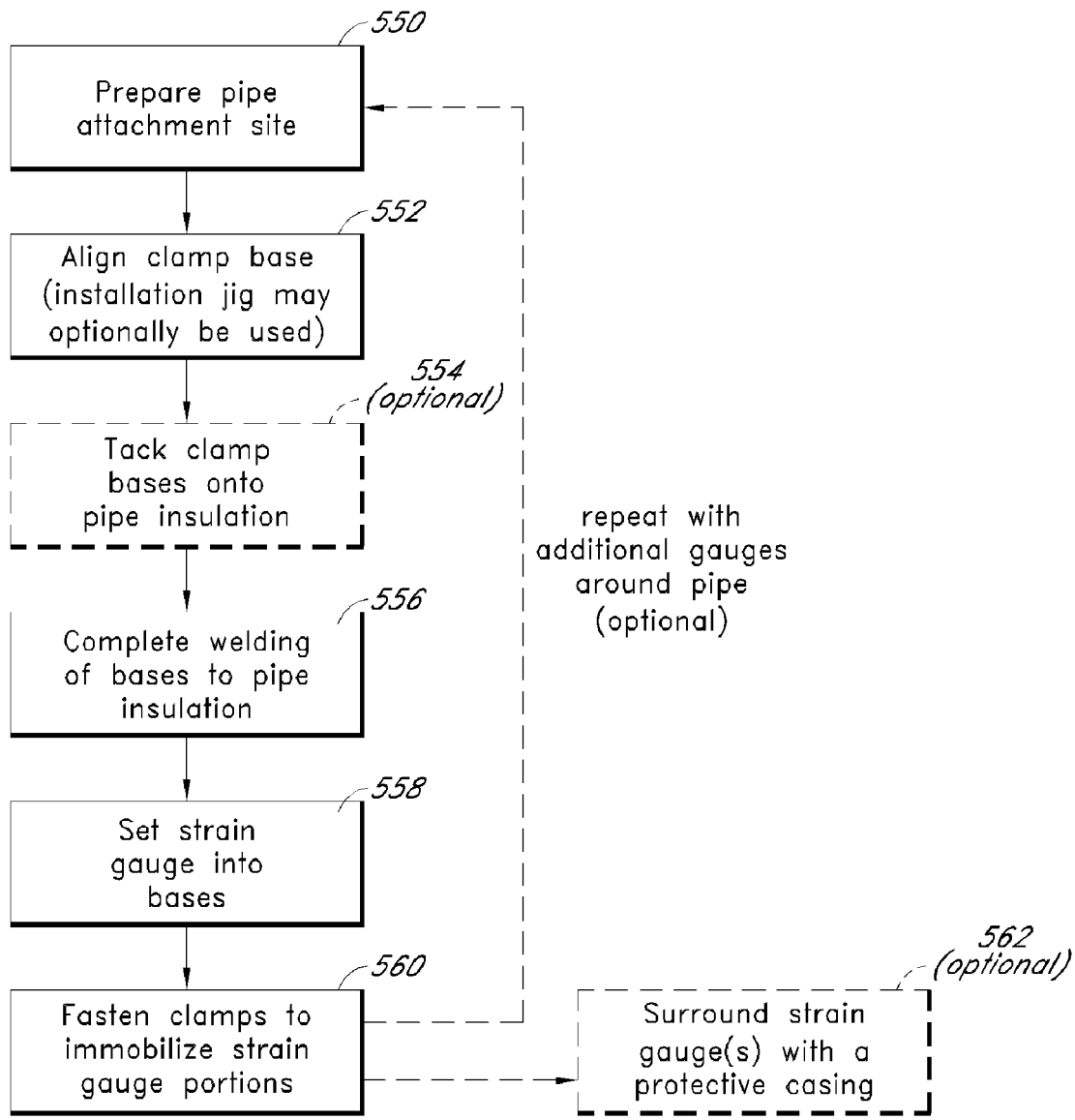
FIG. 5 is a block diagram of a method that can be used to attach a strain gauge to a pipe.

FIG. 5 is a block diagram of an embodiment of a method of attaching a strain gauge to a catenary riser for strain testing. Typically, this process occurs on land before transporting a section of pipe to the installation location. It is also possible to attach strain gauges on the ship but the process generally occurs prior to lowering the pipe into the water. In some embodiments, Hot Gas Hand Welding can be used for attaching the LVDT fixtures to the surface of the 3LPP, 5LPP, or similar coated pipes. Hot Gas Welding is generally a manual process using a filler material to perform the weld. The gas (air) simultaneously transmits heat into the parent materials and the welding rod to allow molecular interlocking to take place.

A Hot Gas Hand Welding system that can be used generally comprises a welding gun, a clean air supply unit, and a welding tip. The welding gun typically is provided with a means to adjust the welding temperature. One example device that is suitable for this type of welding is the Hot Jet S with speed welding nozzle available from LEISTER. Other suitable welding techniques to accomplish welds, particularly, for example, plastic welds, as described herein would be known to those of skill in the art.

In some embodiments, the surface of the insulated piping can be prepared prior to welding the clamps 220 for mounting the strain testing gauge (block 550). During such a process, for example, the Polypropylene surface of the risers can be sanded or otherwise scraped down to virgin material and chemically cleaned. In some embodiments, the surfaces can be prepared such that they are coplanar with the lower surface of the bases 222 so that the clamp bases are more likely to maintain contact with the pipe's attachment surfaces and limit or avoid air bubbles between the two surfaces. It is also preferred to prepare the pipe surfaces so that the clamps will be placed along the pipe in a manner to hold the displacement sensor 214 in an orientation that is substantially parallel to the longitudinal axis of the pipe. Such a preparation process can be performed with an eye towards minimizing the disturbance of the insulation and so as not to damage the overall effectiveness of the insulation. For example, the insulation layers can remain substantially unaltered.

In some embodiments, for example, a scraper can be used to remove the rough outer surface of the polypropylene insulation at each attachment location. Each location is then wiped with a clean cloth to remove dirt, oil, or loose scrapings to provide a better surface for welding. Each base can also be scraped in the area where it will contact the pipe insulation to remove oxidized molecules that may interfere with the welding process.

Figure 6:
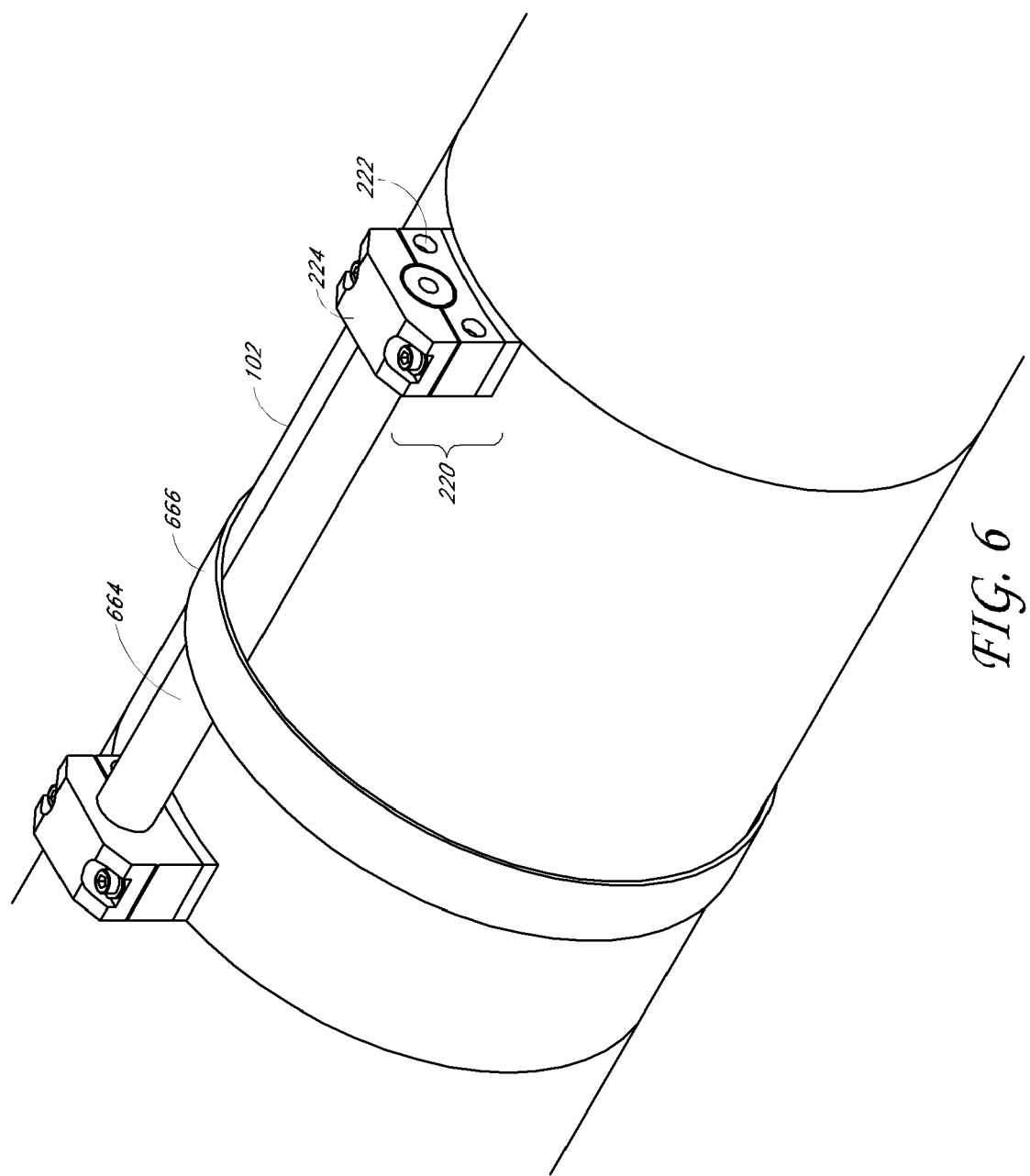
FIG. 6 illustrates a simple embodiment of an alignment jig and temporary strap that can be used to temporarily hold attachment clamps in place on a pipe.

In some embodiments, an installation or alignment jig 664 (see FIG. 6) can be used to temporarily attach a first clamp base 222 and a second clamp base 222 to the attachment site at the appropriate distance and orientation (block 552). This can help align the bases 222 with their respective installation location marks. In some embodiments, the alignment jig 664 can be as a pipe having a length and diameter approximate to that of the LVDT 214 and the armature attachment bar 218. Once the bases 222 are in position, the alignment jig 664 and clamps 220 can be temporarily secured to the pipe with a strap 666 or other securing method, such as adhesives, tacks, or the like, to hold the clamp bases in place at the prepared attachment locations.

Once this is done, the welding gun, with a "tacking" tip, can be used to tack the perimeters of the bases 222 onto the outer surface of the insulation of the pipe 102 (block 554). In some embodiments, a common form of hot gas welding, known as "High Speed Welding," can be used to complete the attachment of the clamp bases 222 to the insulation on the pipe 102 (blocks 554, 556).

High speed welding tips are designed to guide the welding rod into the weld zone while simultaneously heating up the rod and the base material. A shoe at the end of the rod orifice allows the operator to apply the welding pressure. The welding pressure is dependent on material type and rod size. It is understood that other suitable forms of hot gas welding or other welding techniques can also be used.

In embodiments where Moplen COAT EP/60 BIANCO is the outer layer of pipe insulation and/or the material used for the strain gauge clamps, it is preferable that the welder be set to between about 300° C. and about 340° C. with an air flow volume of about 45 l/min and 55 l/min. Other suitable settings will be apparent to those of skill in the art based on the welding equipment and properties of the materials used. Utilizing a tack weld helps assure that the bases are in proper place and alignment and that they stay in position when additional welding is performed. In some embodiments, the tack welding can be skipped. In other embodiments, the strap 666 and alignment jig 664 can be removed once tack welding is completed. This can help allow easier access to all sides of the clamp bases for the next steps.

After tacking, it is preferable to allow three to four minutes for the tack weld to cool. In some embodiments, forced cooling with an air hose or other means is avoided as it can cause thermal stresses or weaken the weld. After an appropriate cooling period, the welding can be completed using regular plastic welding (block 556). The welding rod used is preferably scraped, before use to clean it and remove any oxidized material, as with the preparation of the clamp bases 222. The regular weld preferably surrounds the clamp base to provide the most bonded surface area.

In some embodiments, it may be desired to make multiple welding passes around a clamp base 222 to further strengthen the weld between the pipe 102 and the bases 222. In some embodiments, a first welding pass can be allowed to cool before a subsequent pass. For example, a delay of approximately 3-4 minutes between passes will provide stronger welds—similar to the preferred time to cool the tack welds.

Compatible materials between the clamp bases 222 and the welding rod filling material can be used to help ensure lasting welds. For example, the filler and the bases 222 material can have the same or a close melt flow index. One of skill in the art will has familiarity with proper conditions for thermoplastic welding as described herein.

Once the bases 222 are welded in place, the LVDT 214 is placed in the slot of one clamp base 222, while the armature attachment bar 218 is placed in the other (block 558). The clamp tops are then set in place over the strain gauge pieces and fastened to the clamp bases to hold the strain gauge in place (block 560).

Fasteners 226, which can be made from Monel 400, Monel 500, Inconel 625, Super Duplex Steels, or other long life corrosion resistant materials, can be bolts (as shown in FIG. 3), screws, or other fastening mechanisms and can be used to close the strain sensor clamps 220. Monel is also a preferred material for fasteners 226 because it is additionally resistant to hard marine growth. The clamp bases 222, as noted above, can have two threaded dowels 328 inserted into holes 329. The threads can be aligned with clearance holes 331 through the clamp base 222. The clamp top 224 can have two clearance holes 331 which can be for ¼-20 socket head cap screws, which can serve as the fasteners 226, although other sizes can also be used. Flat washers 330 can be used here to distribute the load and cross-drilled heads for Monel 400 seizing wire to reduce the likelihood of the fasteners 226 backing out. The fasteners 226 can thread into the threaded dowels 328 in the base and can be tightened enough to close the gap between the clamp top 224 and base 222.

In some embodiments, this procedure can be repeated one or more times with additional strain gauges set out at various locations around the circumference of the pipe 102—generally approximately the same distance along the length of the pipe section. This would allow the collection of data indicative of a pipe bending in a multitude of directions.

Optionally, the one or more strain gauge assemblies can be enclosed in a protective casing. This casing is meant to help reduce impact damage to the strain gauges. In some cases, these casings may further be waterproof or water resistant to reduce corrosion of strain gauge components. In some embodiments, the interior of the casing can be pressure neutralized. In some embodiments, the casing is a steel shell connected to the pipe with rubber bushings.

There are numerous alternatives that may be employed without deviating from the spirit of this disclosure. For example, although FIGS. 2 and 3 illustrate a particular embodiment of clamp 220, the clamp 220 itself or one or more of its parts 222, 224 may take numerous other forms. For example, a top clamp 224 can include a flexible or rigid rubber piece that is bolted in place in a manner similar to that shown. Another alternative can be a generally U-shaped bolt that would fit around a portion of the strain gauge. It could, for example, be threaded at both ends that would fit through holes in the bottom clamp 222 and be secured by nuts. Epoxies or other glues that are degassed, that have a low porosity, and that will not break down in water can also be suitable forms of bonding the strain gauge to the clamp bottoms 222 and/or the clamp bottoms 222 to the insulated pipes. Importantly, preferred alternative epoxies or other glues should be able to maintain their bonds for the expected pipe submersion time of up to approximately 25-30 years or more.

Although the foregoing has been described in terms of certain specific embodiments, other embodiments will be apparent to those of ordinary skill in the art from the disclosure herein. Moreover, the described embodiments have been presented by way of example only, and are not intended to limit the scope of the disclosure. Indeed, the novel methods and systems described herein can be embodied in a variety of other forms without departing from the spirit thereof For example, mounting blocks can be constructed from materials other than those disclosed herein. Similarly, assembly of the strain gauge in the mounting blocks can utilize any of a variety of suitable fastening devices, including screws, nuts and bolts, adhesives, and the like. Accordingly, other combinations, omissions, substitutions and modifications will be apparent to the skilled artisan in view of the disclosure herein. Thus, the present disclosure is not limited by the embodiments described above.

What is claimed is:

1. A method of attaching a sensor to a pipe, the method comprising:
   aligning at least two bases along an axis parallel to a length of insulated pipe;
   bonding the bases to insulation extending around and covering an entire outer surface of the pipe, without clamps to thereby prevent damage to the insulation;
   placing a sensor assembly into the bases; and
   securing the sensor assembly into the bases so that the sensor assembly does not move within the bases.

2. The method of claim 1 wherein the bonding step is accomplished by welding the bases using a plastic weld.

3. The method of claim 2 wherein the welding step is accomplished without significant degradation of the insulation.

4. The method of claim 2 wherein the insulation and the at least two bases are made of polypropylene.

5. The method of claim 4 wherein the at least two bases are made of homopolymer polypropylene.

6. The method of claim 2 wherein the at least two bases are made of a material matching the insulation covering the outer surface of the pipe.

7. The method of claim 6 wherein the at least two bases are constructed so that the bases will fail under impact stress before the stress damages the pipe's insulation.

8. The method of claim 2 wherein the welding is accomplished by hot gas hand welding.

9. The method of claim 2 wherein the steps of claim 2 are repeated for multiple sensor assemblies positioned at different locations around a circumference of the pipe.

10. The method of claim 1 wherein no permanent bands are used to aid in the bonding of the bases.

11. A strain gauge assembly comprising:
    a length of pipe including one or more layers of polypropylene insulation extending completely around the outer surface of the length of pipe;
    at least one attachment base welded to the outer layer of insulation without clamping mechanisms that extend completely around the outer surface of the insulation, to thereby prevent damage to the insulation;
    a displacement sensor attached to the at least one attachment base, so that the displacement sensor is immobile with respect to the at least one attachment base and registers displacement proportional to the bending of the length of pipe.

12. The strain gauge assembly of claim 11 further comprising a second attachment base welded to the outer layer of insulation, wherein the displacement sensor is attached to the second attachment base at an end substantially opposed to an attachment point of the displacement sensor to the at least one attachment base.

13. The strain gauge assembly of claim 11 further comprising at least a second displacement sensor attached to a different portion of the outer layer of insulation by at least one attachment base, wherein the displacement sensor and the second displacement sensor are able to register displacement proportional to the bending of the length of pipe in different planes.

14. The strain gauge assembly of claim 11 further comprising a protective casing substantially enclosing the displacement sensor within a cavity of the casing.

15. The strain gauge assembly of claim 11 wherein the attachment base is welded to the outer layer of insulation by a plastic weld.

16. The strain gauge assembly of claim 11 wherein the at least one attachment base is made of a material substantially similar to the outer layer of insulation.

17. The strain gauge assembly of claim 16 wherein the at least one attachment base is made of a material identical to the outer layer of insulation.

18. A device for attaching a strain gauge to a length of pipe with insulation extending completely around, comprising:
    a first base having a cavity adapted to accept a first portion of a strain gauge, the base adapted to be welded to insulation on a pipe;
    a first restraining member adapted to hold the first portion of a strain gauge immobilized within the cavity of the first base;
    a second base having a second cavity adapted to accept a second portion of the strain gauge, the base adapted to be welded to the insulation without clamping mechanisms to thereby inhibit damage to the insulation; and
    a second restraining member adapted to hold the second portion of the strain gauge immobilized within the second cavity of the second base,
    wherein any movement of the first portion of the strain gauge with respect to the second portion of the strain gauge is indicative of strain on the underlying pipe.

19. The device of claim 18 wherein the first and second bases comprise a plastic material and are adapted to be welded to the insulation using a plastic weld.

20. The device of claim 18 wherein the first and second restraining members include a corrosion-resistant material.

21. The device of claim 20 wherein the first and second restraining members each include a plastic piece adapted to hold the respective portions of the strain gauge in the cavities of the respective first and second bases, and wherein the first and second bases are each adapted to accept at least one fastener for holding the respective plastic pieces and strain gauge portions in place.

22. The device of claim 18 wherein the first and second restraining members include a corrosion-resistant coating.

23. The device of claim 18 further comprising a protective casing substantially enclosing the strain gauge to thereby reduce impact damage to the strain gauge.

24. The device of claim 23 wherein the casing is waterproof.

25. The device of claim 1 further comprising a protective casing substantially enclosing the strain gauge to thereby reduce impact damage to the strain gauge.

26. The device of claim 25 wherein the casing is waterproof.

* * * * *